S. A. Cox,
Making Railway Chairs,
No. 479. Reissued July. 14, 1857.
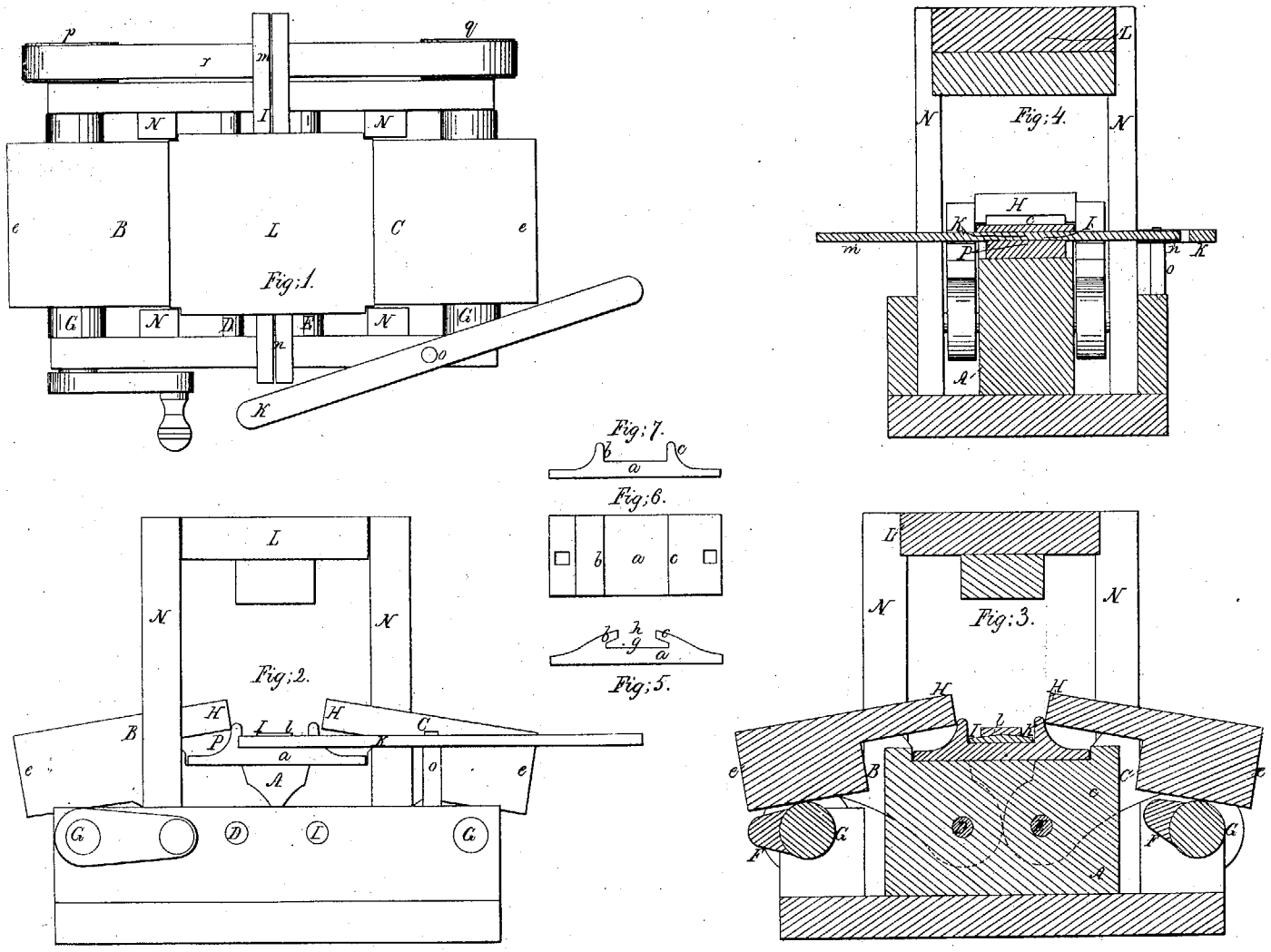
N. PETERS, PHOTO-LITHOGRAPHER, WASHINGTON, D. C.

UNITED STATES PATENT OFFICE.

NEW YORK WROUGHT IRON RAIL ROAD CHAIR COMPANY, OF NEW YORK, N. Y., ASSIGNEE OF SAWYER AND HALL, ASSIGNEES OF SAMUEL A. COX, DECEASED.

MACHINE FOR BENDING THE LIPS OF WROUGHT-IRON RAILWAY-CHAIRS.

Specification forming part of Letters Patent No. 6,683, dated August 28, 1849; Reissue No. 479, dated July 14, 1857.

*To all whom it may concern:*

Be it known that SAMUEL A. COX, of Malden, Massachusetts, now deceased, did in his life-time invent certain new and useful Machinery for Bending the Lips of Wrought-Iron Railway-Chairs, and did assign his whole right, title, and interest to the aforesaid invention unto MATTHIAS P. SAWYER and JOHN W. HALL, of Boston, Massachusetts, for which invention Letters Patent of the United States were duly issued unto the aforesaid SAWYER and HALL, which Letters Patent have been duly assigned, by proper instrument in writing, to the NEW YORK WROUGHT IRON RAIL ROAD CHAIR COMPANY, as by the record-books of the United States Patent Office will fully appear. Now, be it known that the aforesaid corporation, by its president, does hereby make known that the following is a full, clear, and exact amended description and specification of the invention of SAMUEL A. COX aforesaid, reference being had to the drawings making part of the same, in which are exhibited various views of his improved machinery to be used in manufacturing malleable-metal or wrought-iron railroad-chairs.

Of the said drawings, Figure 1 denotes a top view of the said machine. Fig. 2 is a front elevation of it. Fig. 3 is a central vertical and longitudinal section of it. Fig. 4 is a central vertical and transverse section of it. Fig. 5 is a side view of a wrought-iron chair as made by the said machine. Fig. 6 is a top view, and Fig. 7 is a side view, of it as it appears before being subjected to the action of the machine.

IN the process of making wrought-iron chairs a bar of metal is first wrought or rolled into the shape of which Fig. 7 would represent a transverse section—that is to say, into the form of a flat plate, *a*, having two lips, *b c*, elevated perpendicularly on it.

The peculiar purpose of the machine is to bend chair-lips from a vertical position into an inclined one, so as to embrace properly the lower part of a rail.

In Figs. 2, 3, and 4, A represents a metallic bed-block for receiving and supporting the chair-blank while the lips are being bent. B and C are two arms or levers, each being supported on a fulcrum-shaft or journals, as seen at D and E. The tail *e* of each of the said levers or arms rests on and over a cam, F, which is fixed to a horizontal shaft, G, arranged as seen in Fig. 3.

Above the fulcrum of each lever, and situated with respect to the bed or base block A, as seen in Figs. 2 and 3, is a projection, H, which, when the lever is raised up, is brought into contact with the lip *b* or *c*, and bends it down upon the former I. The said former consists of a bar of metal made to correspond in its transverse section to that of the base-plate and neck of the rail to be supported in the chair, as shown at *g* and *h* in Fig. 5.

The former may be said to be composed of two parts—viz., the base part *k* and the neck part *l*—the said neck portion being elevated on the other or base portion. From one end of the said former a handle, *m*, extends, while on its opposite end there is a projection, *n*, for one arm of a hand-lever, *k*, to act against, the said hand-lever being arranged as shown in Figs. 1 and 4, and made to turn on a fulcrum at *o*.

Between the projections H H, and directly over the base or the former when in place on a chain-blank, is a drop-hammer, L, which is suitably supported by and so as to play up and down between guides or posts N N N N. This drop-hammer may be elevated by any suitable means, and suffered to drop down upon the lips, so as to insure their being bent down into close contact with the former. The two cam-shafts should be connected together by suitable gearing or pulleys, *p q*, and an endless belt or band, *r*, or other suitable equivalents, and in such manner that their movements may be simultaneous, and so as to elevate both the benders at one and the same time.

I do not deem it always essential to use the drop-hammer in connection with the bending-levers, but generally prefer to do so.

In using the said machine a chain-blank is placed and supported on the bed A, as seen at P in Figs. 2, 3, 4, the former I being placed on the said blank so as to be between its lips and on its base, the base of the former being placed flatly on the base-plate of the chair. This being effected, motion is given to the cams, so as to elevate the tails of the bending-levers, and thereby cause the projections H H to press or bend the lips of the chain so that their inner surfaces shall correspond with the surface of the former. Next, the drop-hammer, if used, is to be suffered or caused to fall down upon the lips with force sufficient to cause their being bent into close contact with the former. By afterward applying power to the lever K, the former may be forced out of the chair.

Wrought-iron chairs made by hand or partially by rolling and partially by hand were known prior to the date of the aforesaid SAMUEL A. COX'S invention, which therefore is only a combination of mechanical devices for effecting a known result more cheaply, in a shorter time, and more perfectly.

What is claimed as the invention of SAMUEL A. COX aforesaid, deceased, is—

1. A suitable support for a chair-blank, in combination with bending-levers or a bending apparatus and a former, or the equivalents thereof, acting in combination, substantially as specified herein.

2. A drop-hammer or its equivalent, in combination with bending-levers, a former, and a suitable support for the chair-blank, or their equivalents, all substantially such and acting in combination substantially in the manner hereinbefore set forth.

In testimony whereof I, JACOB ROWE, president of the aforesaid company, have hereunto set my hand and affixed the seal of the aforesaid company, in the city of New York, on this 10th day of June, A. D. 1857.

JACOB ROWE, [L. S.]
*President.*

In presence of—
THOS. D. DOBBS,
I. H. DOBBS.